(12) United States Patent
Arliaud et al.

(10) Patent No.: US 11,327,143 B2
(45) Date of Patent: *May 10, 2022

(54) METHOD FOR CONTROLLING THE ORIENTATION OF A SOLAR TRACKER BASED ON CARTOGRAPHIC MODELS

(71) Applicant: NEXTracker Inc., Fremont, CA (US)

(72) Inventors: Jérôme Arliaud, Pourrières (FR);
Adrien Crucifix, Marseilles (FR);
Philippe Blanc, Sophia Antipolis (FR)

(73) Assignee: NEXTRACKER INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,983

(22) Filed: Apr. 6, 2021

(65) Prior Publication Data

US 2021/0223348 A1    Jul. 22, 2021

Related U.S. Application Data

(63) Continuation of application No. 16/903,127, filed on Jun. 16, 2020, which is a continuation of application
(Continued)

(30) Foreign Application Priority Data

Jul. 2, 2015  (FR) ..................... 1556228

(51) Int. Cl.
*H02S 20/32*  (2014.01)
*F24S 50/20*  (2018.01)
(Continued)

(52) U.S. Cl.
CPC ............ *G01S 3/7861* (2013.01); *F24S 50/20* (2018.05); *G05D 3/105* (2013.01); *H02S 20/10* (2014.12);
(Continued)

(58) Field of Classification Search
CPC . G01W 1/10; G01W 1/12; G01W 1/02; Y02E 10/47; F24S 50/20; F24S 2020/16; H02S 20/32
See application file for complete search history.

(56) References Cited

U.S. PATENT DOCUMENTS 8,369,999 B2   2/2013  Beck
8,594,375 B1 * 11/2013  Padwick .............. G06K 9/4652
                                                      382/103
(Continued)

FOREIGN PATENT DOCUMENTS

CN       101292361 A    10/2008
DE    202011104051 U1     1/2012
WO         9313396 A1     7/1993

OTHER PUBLICATIONS

Brazilian Office Action issued in Brazilian Patent Application No. BR112017025863-3 dated Jul. 7, 2020, with English translation of relevant parts.
(Continued)

*Primary Examiner* — Thanh Luu
(74) *Attorney, Agent, or Firm* — Weber Rosselli & Cannon LLP

(57) ABSTRACT

A method for controlling the orientation of a single-axis solar tracker (1) orientable about an axis of rotation (A), said method repetitively completing successive control phases, where each control phase implements the following successive steps:
 a) observing the cloud coverage above the solar tracker (1);
 b) comparing the observed cloud coverage with cloud coverage models stored in a database, each cloud coverage model being associated to an orientation setpoint value of the solar tracker;
 c) matching the observed cloud coverage with a cloud coverage model;
(Continued)

(1a)

(1b)

(1c)

(1d)

d) servo-controlling the orientation of the solar tracker by applying the orientation setpoint value associated to said cloud coverage model retained during step c).

The present invention finds application in the field of solar trackers.

17 Claims, 6 Drawing Sheets

Related U.S. Application Data

No. 15/739,667, filed as application No. PCT/FR2016/051650 on Jun. 30, 2016, now Pat. No. 10,684,348.

(51) Int. Cl.
  *G01S 3/786* (2006.01)
  *G05D 3/10* (2006.01)
  *H02S 50/00* (2014.01)
  *H02S 40/20* (2014.01)
  *H02S 20/10* (2014.01)

(52) U.S. Cl.
  CPC ............. *H02S 20/32* (2014.12); *H02S 40/20* (2014.12); *H02S 50/00* (2013.01); *F24S 2201/00* (2018.05); *Y02E 10/47* (2013.01)

(56) References Cited

U.S. PATENT DOCUMENTS

| | | | |
|---|---|---|---|
| 10,684,348 B2 | 6/2020 | Arliaud et al. | |
| 11,196,381 B2 | 12/2021 | Arliaud et al. | |
| 2007/0084502 A1 | 4/2007 | Kelly et al. | |
| 2010/0139644 A1 | 6/2010 | Schwarzbach et al. | |
| 2010/0294337 A1 | 11/2010 | Sherman et al. | |
| 2011/0083718 A1 | 4/2011 | Wichner | |
| 2011/0158467 A1 | 6/2011 | Lai | |
| 2011/0220091 A1 | 9/2011 | Kroyzer | |
| 2011/0276269 A1 | 11/2011 | Hummel | |
| 2011/0282514 A1 | 11/2011 | Ropp et al. | |
| 2013/0048048 A1 | 2/2013 | Flanery et al. | |
| 2013/0256506 A1 | 10/2013 | Xu | |
| 2014/0067733 A1 | 3/2014 | Humann | |
| 2015/0186904 A1 | 7/2015 | Guha et al. | |

OTHER PUBLICATIONS

Brazilian Office Action issued in Brazlian Patent Application No. BR112017027598-8 dated May 20, 2020.
Chinese Office Action issued in Chinese Patent Application No. 201680037999.4 dated Jul. 9, 2020, with English translation, 16 pages.
European Office Action issued in European Application No. 20151750.5 dated Mar. 12, 2021, 8 pages. English translation not available.
Extended European Search Report issued in European Patent Application No. 20151750.5 dated Mar. 11, 2020 with English machine translation.
Indian Office Action issued in Indian Application No. 201817001567 dated Dec. 23, 2020, with Eng. translation, 6 pages.
Indian Office Action issued in Indian Patent Application No. 201717043221 dated May 1, 2020, 7 pages.
International Search Report dated Nov. 17, 2016 re: Application No. PCT/FR2016/051650; pp. 1-3; citing: US 2007/084502 A1, DE 20 2011 104051 U1, US 2013/256506 A1, WO 93/13396 A1 and US 2011/083718 A1.
Preliminary Search Report and Written Opinion issued in French Patent Application No. 1902956 dated Sep. 16, 2019, 7 pages. No English translation available.
U.S. Office Action issued in U.S. Appl. No. 15/577,428 dated Dec. 14, 2018, 24 pages.
U.S. Office Action issued in U.S. Appl. No. 16/903,127 dated Jun. 11, 2021.
U.S. Office Action issued in U.S. Appl. No. 17/187,067 dated May 14, 2021, 13 pages.
Extended European Search Report issued in European Application No. 21174126.9 dated Sep. 13, 2021, 11 pages. English translation not available.
U.S. Office Action issued in U.S. Appl. No. 17/222,742 dated Sep. 21, 2021.
Final Office Action issued in U.S. Appl. No. 17/222,742 dated Jan. 7, 2022.

* cited by examiner (a)

(b)

(c)

(d)

(e)

METHOD FOR CONTROLLING THE ORIENTATION OF A SOLAR TRACKER BASED ON CARTOGRAPHIC MODELS

TECHNICAL FIELD

The present invention relates to a method for controlling the orientation of a single-axis solar tracker, as well as a single-axis solar tracker designed to implement such a method.

The invention concerns the field of solar trackers, also called tracker support systems, provided to support solar collectors, generally of the photovoltaic panel type.

More particularly, it concerns the solar trackers of the single-axis type, that is to say orientable according to one single main axis of rotation, for a rotation allowing tracking the Sun during its rise and its descent from east to west. It should be noted that such a main axis of rotation generally extends horizontally and substantially parallel to the ground on which the solar tracker is anchored.

BACKGROUND

In this field, it is common to servo-control the orientation of the solar tracker based on an astronomical calculation of the position of the Sun, for a real-time positioning facing the Sun.

However, this servo-control type has a major drawback by offering a yield deficit under certain meteorological conditions, and we will advantageously refer to FIG. 1 for explanation; this FIG. 1 including four diagrams (1a), (1b), (1c) and (1d) each illustrating two solar trackers ST under different meteorological conditions, with the Sun SO always at the same position and with the solar trackers ST always orientated facing the Sun.

The diagram (1a) illustrates ideal meteorological conditions, in the absence of clouds, and the solar trackers ST are orientated facing the Sun SO in order to benefit from a maximum direct solar radiation Rdir. Under these optimum conditions with a zero-cloud coverage, the servo-control on the position of the Sun SO provides a maximum operation; such a servo-control corresponding to a servo-control of the orientation of the solar tracker on an inclination angle called direct inclination angle defined by the direction of the direct solar radiation Rdir at the solar tracker.

The diagrams (1b), (1c) and (1d) illustrate degraded meteorological conditions, with different cloud coverages depending in particular on the cloudy surface or overcast surface, the types of present clouds NU, the number and the position of the clouds NU in front of the Sun SO.

Under such cloudy conditions, the servo-control on the position of the Sun SO may not provide the best yield, when not considering the diffuse solar radiation Rdif. The diffuse solar radiation Rdif arises when the direct solar radiation Rdir is dispersed in the clouds NU and the atmospheric particles. The diffuse solar radiation Rdif results from the diffraction of light by the clouds NU and by the various molecules in suspension in the atmosphere. Hence, the diffuse solar radiation Rdif does not necessarily follow the direction defined by the Sun SO in the direction of the observation point at the Earth's surface.

Consequently, under cloudy conditions, it may be preferable, in order to obtain a maximum yield with regards to these conditions, to orientate the solar trackers ST in an orientation called indirect or diffuse orientation according to a direction of the diffuse solar radiation Rdif which does not necessarily correspond to the direction of the direct solar radiation Rdir; such a servo-control corresponding to a servo-control of the orientation of the solar tracker on an inclination angle called diffuse inclination angle defined by the direction of the diffuse solar radiation Rdif at the solar tracker.

In the diagrams (1b), (1c) and (1d), all the solar trackers ST are orientated according to the direct inclination angle (facing the Sun) while orientations according to diffuse inclination angles would offer better yields.

Thus, those skilled in the art would be inclined to servo-control, in real-time, the orientation of the solar tracker on an optimum inclination angle corresponding to a maximum solar radiation. In the absence of clouds, the optimum inclination angle would correspond to the direct inclination angle and, in the presence of a cloudy coverage and even one single cloud in front of the Sun, the optimum inclination angle would correspond to a diffuse inclination angle. For this purpose, it would be sufficient to measure the magnitude of the radiation at different directions (or different inclinations), and establish the direction corresponding to a maximum magnitude in order to deduce the optimum inclination angle.

However, proceeding in this manner would have numerous drawbacks, all of them relating to the variation of the diffuse solar radiation over time. Indeed, depending on the time evolution of the cloud layer (because of the displacement of the clouds under the effect of the winds) and depending on the composition of this cloud layer (number, dimensions, location and types of clouds), the diffuse solar radiation may vary more or less rapidly and therefore the optimum inclination angle may vary more or less quickly over time.

Thus, by servo-controlling the orientation of the solar tracker on this optimum inclination angle, the solar tracker may be brought to change its orientation more or less frequently and more or less quickly. Yet, each orientation change urges at least one actuator (an electric motor in general), resulting in an electrical consumption and wear of the mechanical members loaded by the orientation change (members of the motor, bearings, rotation guide elements . . . ). These electrical consumptions and these wears will not necessarily be compensated by the gains in productivity when switching in real-time on the optimum inclination angle.

As example, starting from an initial situation where the optimum inclination angle corresponds to the direct inclination angle (because of the absence of clouds between the Sun and the solar tracker), if one single cloud passes in front of the Sun for a few minutes, the optimum inclination angle will be modified during these few minutes before returning afterwards to the direct inclination angle. In this case, servo-controlling in real-time the orientation of the solar tracker on the optimum inclination angle would lead to displacing the solar tracker during these few minutes, for a gain which is certainly very little with regards to the electrical consumption of the actuator(s) and to the wear.

BRIEF SUMMARY

The present invention aims at solving these drawbacks by proposing a method for controlling the orientation of a single-axis solar tracker, implementing a step of matching real observations of the cloud coverage with cloud coverage models stored in a database, in order not to systematically servo-control the orientation of the solar tracker on the optimum inclination angle, but to apply an advantageous trade-off between the gains in solar energy productivity and the electrical energy losses of the actuator(s), and possibly by taking into account the wear caused by the orientation changes.

To this end, it proposes a method for controlling the orientation of a single-axis solar tracker orientable about an axis of rotation, said method repetitively completing successive control phases, where each control phase implements the following successive steps:

a) observing the cloud coverage above the solar tracker;

b) comparing the observed cloud coverage with cloud coverage models stored in a database, each cloud coverage model being associated to an orientation setpoint value of the solar tracker;

c) matching the observed cloud coverage with a cloud coverage model;

d) servo-controlling the orientation of the solar tracker by applying the orientation setpoint value associated to said cloud coverage model retained during step c).

Thus, the method implements a comparison between the observations of the cloud coverage and predefined theoretical models to which are associated orientation setpoint values established to avoid urging the solar tracker too often in orientation changes which would result in a in little energy gain, and even which would result in energy losses, as would be the case for example if one single cloud passes in front of the Sun for a reduced time period. It is understood that the controlling and the servo-controlling of the orientation of the solar tracker covers the controlling and the servo-controlling of its inclination about its axis of rotation, and in particular its inclination angle about this axis.

According to one feature, each cloud coverage model associates an orientation setpoint value which depends on a composition of the cloud layer of said model, said composition depending on at least one of the following parameters: number of clouds, coverage surface of the cloud(s), thickness of the cloud(s), location of the cloud(s), type of the cloud(s).

Thus, each cloud coverage model is constructed to correspond to as many real situations as possible.

According to another feature, for each cloud coverage model, the corresponding orientation setpoint value is predefined according to at least one of the following parameters: a wear rate of mechanical members of the solar tracker loaded during a change of orientation of the solar tracker, an energy consumption necessary to modify the orientation of the solar tracker and a displacement speed of the solar tracker during an orientation change.

Thus, the orientation setpoint value assigned to each cloud coverage model depends on one or several parameter(s) associated to the solar tracker, and in particular to its mechanical characteristics, for the sake of optimizing the changes of orientation of the solar tracker.

According to another feature, the cloud coverage models comprise:

at least one model called zero-cloud coverage model to which is associated an orientation setpoint value on an inclination angle called direct inclination angle established by an astronomical calculation of the position of the Sun;

at least one model called widespread cloud coverage model to which is associated an orientation setpoint value on an inclination angle called optimized inclination angle which does not coincide with the direct inclination angle.

Thus, in the zero-cloud coverage model, there is provided a servo-control on the direct inclination angle (facing the Sun), whereas in the widespread cloud coverage model, there is provided a servo-control on another inclination angle called optimized inclination angle to take into account the diffuse radiation.

In a particular embodiment, the optimized inclination angle corresponds to an angle associated to a horizontal setting of the solar tracker.

Thus, in the case of widespread cloud coverage, there is provided a flat down setting or a horizontal positioning of the solar tracker, for the solar collector(s) lying horizontally.

Advantageously, the cloud coverage models comprise at least one model called fine cloud coverage model to which is associated an orientation setpoint value on a predefined intermediate angle between the direct inclination angle and an angle corresponding to a horizontal setting of the solar tracker.

Thus, in the case of fine (barely thick) cloud coverage, there is provided an intermediate servo-control between the zero angle (horizontal positioning of the tracker) and the direct angle (positioning of the tracker facing the Sun) in order to achieve an interesting trade-off.

Advantageously, the cloud coverage models comprise at least one model called irregular cloud coverage model to which is associated an orientation setpoint value on the direct inclination angle.

Thus, in the case of the presence of sparse clouds, there is provided a servo-control on the direct inclination angle (facing the Sun), in order not to modify the orientation of the tracker each time a cloud passes in front of the Sun.

According to a possibility of the invention, during step a), the observation of the cloud coverage is translated into a mapping of the solar luminance according to different elevation angles and, during step b), the cloud coverage models are constituted by cartographic models and the comparison is based on a comparison between the distribution of the solar luminance on the mapping with the distribution of the solar luminance in the different cartographic models.

In other words, during step b), the distribution in the observation space of the values of the solar luminance of the mapping is compared with that of the different theoretical models; this observation space being either bidimensional if the mapping is established according to two axes, preferably the north-south axis and the east-west axis, or unidimensional if the mapping is established according to one axis, in this instance the east-west axis.

Thus, the matching carried out during step c) is similarly based on a matching of the distribution of the solar luminance on the mapping with a cartographic model having a close or similar distribution with a predefined deviation tolerance.

The elevation angle of the Sun corresponds to the angle around the axis of rotation of the solar tracker, between the horizontal plane and the plane passing by the axis of rotation of the solar tracker and parallel to the Sun rays.

According to a possibility of the invention, considering a maximum solar luminance value corresponding to the maximum value of the solar luminance accessible during a direct radiation observation:

the zero-cloud coverage model corresponds to a cartographic model where the solar luminance is at least equal to 80% of the maximum value within an angular sector smaller than 30 degrees around the direct inclination angle; and the widespread cloud coverage model corresponds to a cartographic model where the solar luminance has, within an angular sector larger than 150 degrees, a low value and a high value, with a difference between the low value and the high value which is lower than 50% of the high value, with the high value which is lower than 50% of the maximum value and with the high value which is associated to an elevation angle deviated by at least 20 degrees from the direct inclination angle.

According to a possibility of the invention, the fine cloud coverage model corresponds to a cartographic model where the solar luminance has, within an angular sector larger than 150 degrees, a low value and a high value, with a difference between the low value and the high value which is lower than 50% of the high value and with the high value which is associated to an elevation angle located at less than 20 degrees from the direct inclination angle.

According to a possibility of the invention, the irregular cloud coverage model corresponds to a cartographic model where the solar luminance is at least equal to 50% of the maximum value within an angular sector smaller than 30 degrees around the direct inclination angle, and is at least equal to 20% of the maximum value within an angular sector smaller than 30 degrees around another inclination angle.

Furthermore, the observation of the cloud coverage may be carried out according to any of the following methods:
  sky images pickup from the ground by means of an image pickup apparatus, such as a camera;
  measurement of the solar luminance from the ground by means of a set of several photosensitive cells;
  recovery of satellites images from the sky above the solar tracker.

With an image pickup, the observation corresponds to an image. With a measurement of the solar luminance by photosensitive cells, the observation corresponds to a matrix of the measurements performed individually by each photosensitive cell, these photosensitive cells being positioned at different elevation angles. With a recovery of satellites images, the observation corresponds to a satellite image of the concerned area.

According to an advantageous feature, during step a), is implemented a step of frequency weighting applied on the observation which depends on both a frequency response of the observation and on the useful frequency band of the solar collector.

Thus, the frequency weighting will consist in applying a frequency filter which will take into account the spectral response of the solar collector.

In a particular embodiment, considering that the method implements a servo-control on a first orientation setpoint value associated to a first cloud coverage model on a first series of several successive control phases, and considering that, subsequently to this first series, the next control phase retains during its step c) a second cloud coverage model associated to a second orientation setpoint value, then the method switches into a servo-control on said second orientation setpoint value only if the first series is followed by a second series comprising a predefined number of successive control phases all of them retaining the second cloud coverage model during their respective steps c).

Thus, in order to limit the mechanical wear of the solar tracker, the second orientation setpoint value will be taken into account only if the observation matches with the second cloud coverage model during a minimum time period.

According to a possibility of the invention, if the first series is not followed by a second series comprising the predefined number of successive control phases all of them retaining the second cloud coverage model, then the method maintains the servo-control on said first orientation setpoint value or switches into a servo-control on a direct inclination angle.

Thus, if the observation does not match with the second cloud coverage model during a minimum time period, then the servo-control remains unchanged or switches into direct Sun tracking.

According to another possibility of the invention, the predefined number of successive control phases of the second series depends on at least one of the following parameters: the time, the angular deviation between the first orientation setpoint value and the second orientation setpoint value, a wear rate of mechanical members of the solar tracker loaded during a change of orientation of the solar tracker, and an energy consumption necessary to modify the orientation of the solar tracker.

In accordance with another feature of the invention, if during a series comprising a predefined number of successive control phases where, during each control phase, no cloud coverage model of the database is matched with the observed cloud coverage, then the method switches into a servo-control on a direct inclination angle.

The invention also relates to a single-axis solar tracker orientable about an axis of rotation, of the type comprising a fixed structure for anchorage to the ground and a platform capable of supporting at least one solar collector, said platform being rotatably actuatable on the fixed structure about said axis of rotation by means of an actuation system, said solar tracker being noteworthy in that it further comprises an observation system of the evolution over time of the cloud coverage above the solar tracker and a control unit linked, on the one hand, to the observation system in order to receive its observations data and, on the other hand, to the actuation system in order to control the rotation of the platform, where said control unit is formed to implement the steps b) to e) of the controlling method as described hereinbefore.

BRIEF DESCRIPTION OF THE DRAWINGS

Other features and advantages of the present invention will appear upon reading the detailed description hereinafter, of non-limiting examples of implementation, made with reference to the appended figures in which.

DETAILED DESCRIPTION

Figure 1:
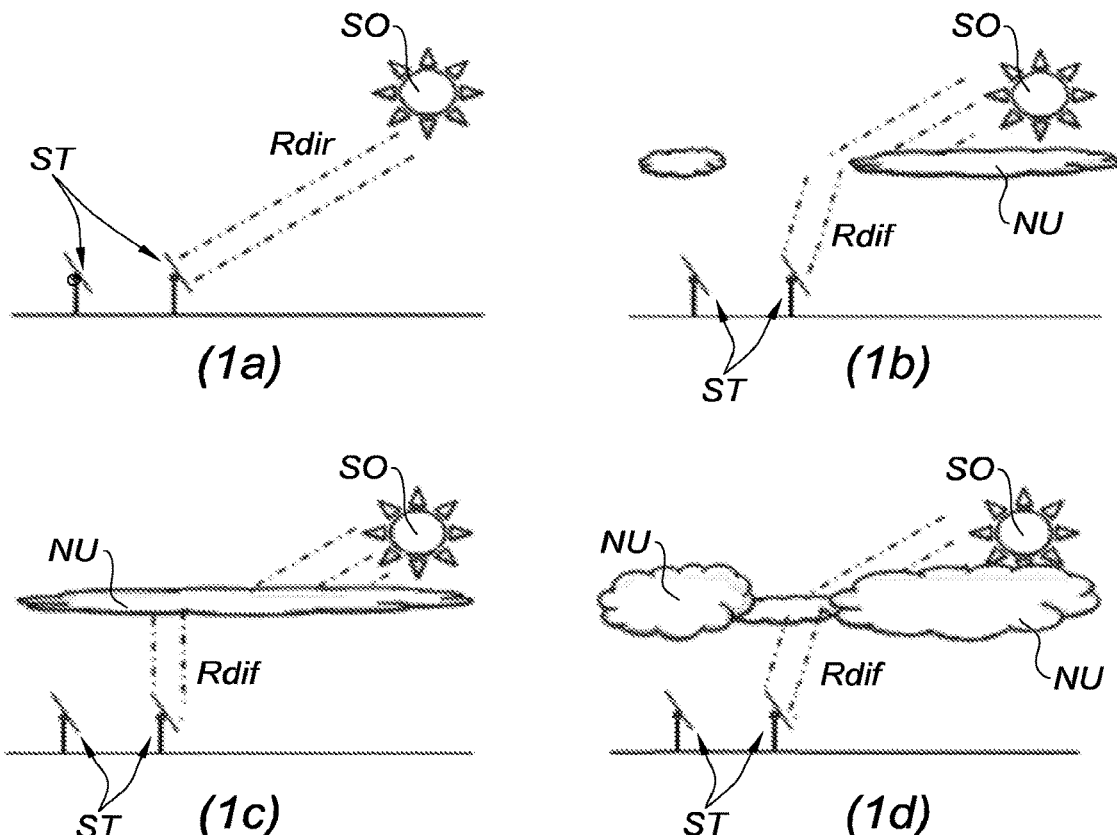
FIG. 1, already discussed, comprises four diagrams (1a), (1b), (1c) and (1d) each illustrating two solar trackers under different meteorological conditions.
Figure 2:
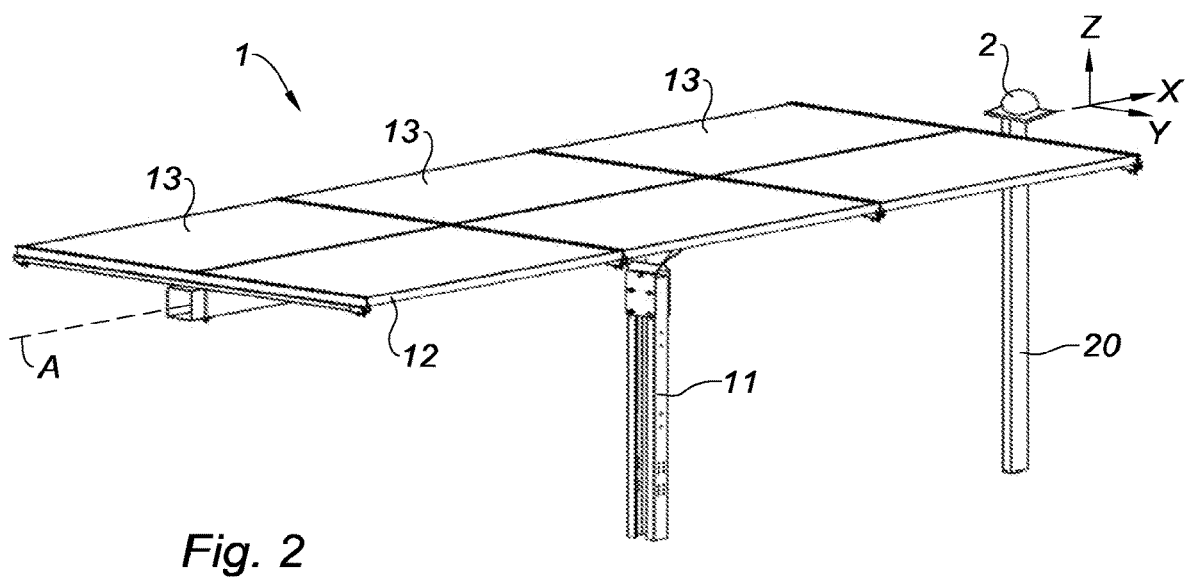
FIG. 2 is a schematic view of a single-axis solar tracker in accordance with the invention, where are illustrated the fixed structure and movable platform assembly and a system for observing the cloud coverage.

Referring to FIG. 2, a single-axis solar tracker 1 orientable about an axis of rotation A, of the type comprising a fixed structure 11 for anchorage to the ground constituted by one or several pylon(s) anchored to the ground, for example by pile driving, screwing, bolting, ballasting, or any other equivalent means allowing fastening and stabilizing the fixed structure 11 to the ground.

The solar tracker 1 further comprises a movable platform 12 rotatably mounted on the fixed structure 11 about the axis of rotation A, and more specifically rotatably mounted on the upper ends of the pylon(s). This platform 12 is capable of supporting at least one solar collector 13, and in particular one or several photovoltaic panel(s).

Figure 7A:
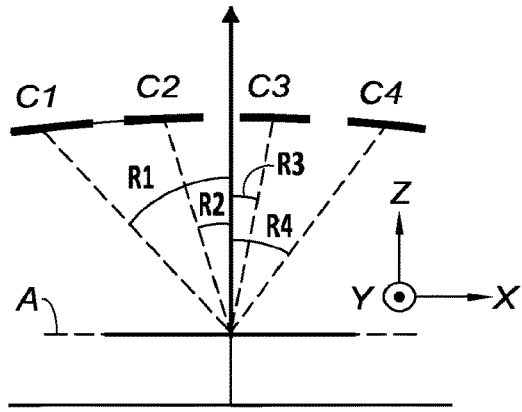
FIG. 7a is a schematic side view of four columns of a bidimensional mapping of the solar luminance, with the azimuth angles associated to the different columns.
Figure 7B:
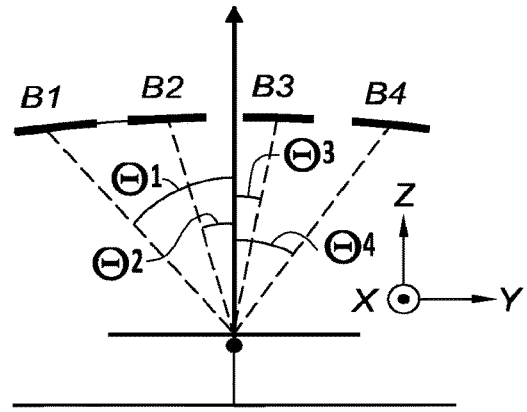
FIG. 7b is a schematic side view of four strips of a unidimensional or bidimensional mapping of the solar luminance, with the elevation or inclination angles associated to the different strips.

Referring to FIG. 2 and to FIGS. 7a and 7b, the axis of rotation A is substantially horizontal and directed according to a longitudinal axis X according to the north-south direction. When the solar tracker 1 is horizontal or flat down (as shown in FIG. 2) with its platform 12 lying horizontally, the platform 12 extends according to a horizontal plane defined by the longitudinal axis X and by a transverse axis Y according to the east-west direction, orthogonally to a vertical axis Z.

In the following description, the inclination angle of the solar tracker 1 (or inclination angle of the platform 12 and of the solar collector(s) 13) corresponds to the angle of the normal to the platform 12 with respect to the vertical axis Z considered in the plane (Y, Z). Thus, when the solar tracker 1 is horizontal or flat down (as illustrated in FIGS. 2, 7a and 7b), this inclination angle is 0 degree.

The solar tracker 1 also comprises an observation system 2 of the cloud coverage above the solar tracker 1, in other words for observing the sky above the solar tracker 1. This observation system 2 may be associated to one single solar tracker 1 or, for economic reasons, may be shared with several solar trackers.

The observation system 2 is fixed, and may be raised with respect to the ground, for example by being mounted on a post 20.

Figure 13:
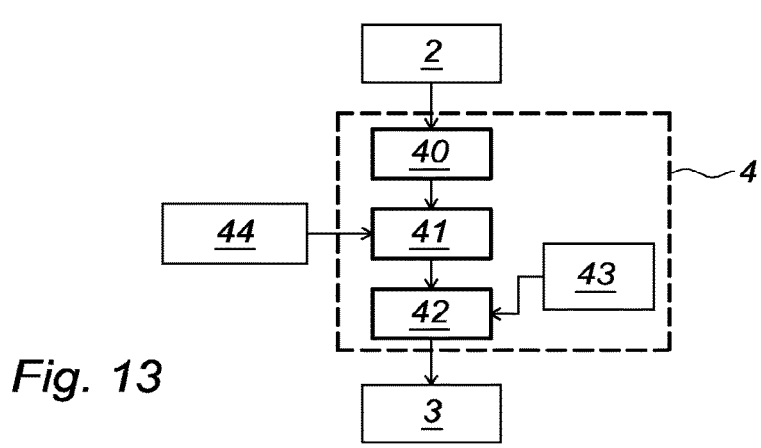
FIG. 13 is a representation in the form of a functional diagram of the functional elements used for the implementation of a controlling method in accordance with the invention.

The solar tracker 1 further comprises an actuation system (not illustrated in FIG. 2 and bearing the reference number 3 in FIG. 13) which ensures rotating the platform 12 about the axis of rotation A.

This actuation system 3 comprises an actuator, for example of the (electric, pneumatic or hydraulic) cylinder type or of the electric motor (for example rotary motor) type. This actuation system 3 further comprises a mechanical system for transmitting the movement at the output of the actuator (a rotational movement for a rotary motor, or a linear movement for a cylinder) into a rotational movement of the platform 12. As a non-limiting example, this mechanical transmission system may be a deformable-parallelogram system, a pulley system, a pinion system, a chain system, a belt system, a clutch system, a transmission shaft system, a connecting rod system, etc.

It is possible to consider that the actuator is specific to the solar tracker 1, or is shared between several solar trackers. In the case where the actuator is shared, the platforms 12 of the different solar trackers are advantageously coupled in rotation, for a synchronous rotation under the effect of the common actuator.

Figure 10:
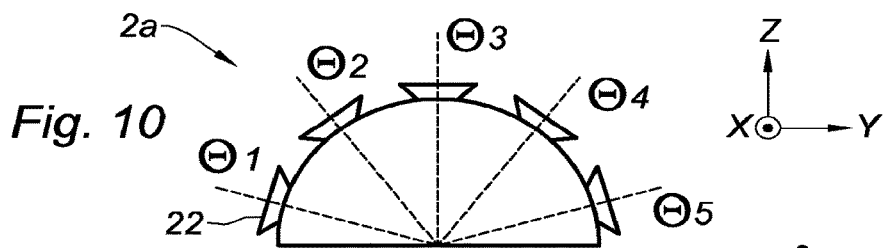
FIG. 10 is a schematic view of another first observation system serving in the definition of the cartographic models of FIG. 11.

Referring to FIG. 10, the solar tracker 1 also comprises a control unit 4 such as an electronic board, which is linked to the observation system 2 to receive its observations (or observations data) and which is also linked to the actuation system 3 in order to control its operation and accordingly control the rotation of the platform 12, in other words the orientation of the solar tracker 1.

This control unit 4 comprises several modules, namely:

a cartographic module 40 provided to translate or convert each observation performed by the observation system 2 into a mapping 5 of the solar luminance, this mapping of the solar luminance reflecting the distribution of the solar luminance at least at different elevation angle (the elevation angle being comparable with the inclination angle and corresponding to the angle about the axis of rotation A of the solar tracker 1, between the horizontal plane (X, Y) and the line extending from the observation system 2 towards the observed point in the sky);

a comparator module 41 which compares the mapping coming from the cartographic module 40 with cartographic models 6 stored in a database 44, and which matches said mapping with a cartographic model 6 established as being the closest in terms of solar luminance distribution, where each cartographic model 6 is associated to an orientation setpoint value of the solar tracker 1;

a servo-control module 42 which recovers both the orientation setpoint value coming from the comparator module 41 as well as the direct inclination angle defined by the direction of the direct solar radiation at the solar tracker 1, this direct inclination angle being derived from an astronomical calculation module 43 which calculates in real-time the position of the Sun, where the servo-control module 42 outputs an angle setpoint towards the actuation system 3 to control the changes of orientation of the platform 12 of the solar tracker 1.

It should be noted that this control unit 4 may be specific to the solar tracker 1, or shared between several solar trackers, and preferably between several solar trackers arranged in line (extending from north to south) within linear solar plants.

Figure 3:
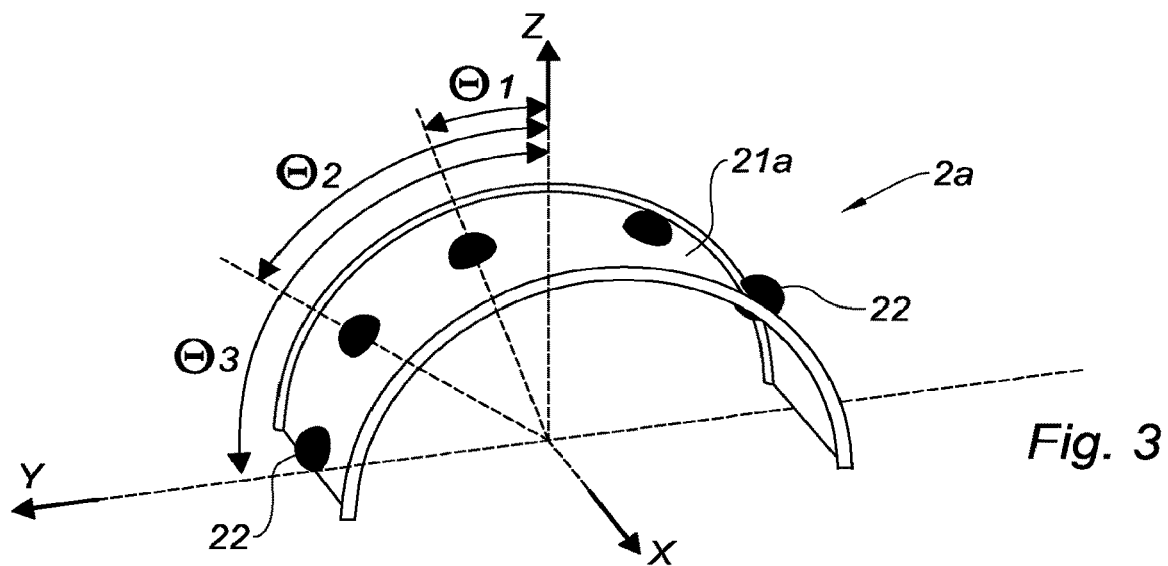
FIG. 3 is a schematic view of a first observation system formed to carry out a unidimensional mapping of the solar luminance, established only in elevation according to an east-west direction.

In a first embodiment illustrated in FIG. 3, the observation system 2a comprises a semi-circular arch shaped support 21a centered around an axis X parallel to the axis of rotation A of the solar tracker, this support 21a supporting photosensitive cells 22.

These photosensitive cells 22 are positioned along several strips (shown in FIGS. 4 and 7b) distributed at several angles called elevation angles θi which are measured with respect to the vertical axis Z in the plane (Y, Z) about the axis X, the reference frame (X, Y, Z) being centered on the center O of the arcuate support 21a. Hence, the elevation angle θi is to be matched with the inclination angle of the solar tracker 1. In the example of FIG. 3, the photosensitive cells 22 are distributed according to six strips at elevation angles of +θ1, +θ2, +θ3, −θ1, −θ2 and −θ3; for example with [θ1]=30 degrees, [θ2]=60 degrees and [θ3]=90 degrees. These elevation angles θi and these strips Bi are also shown in FIG. 7b.

Figure 5:
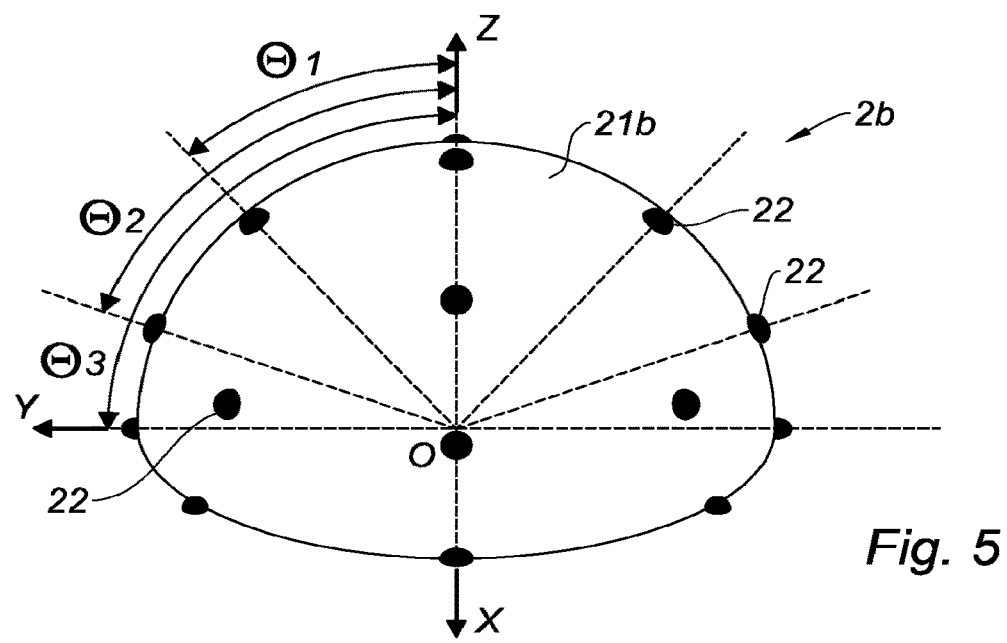
FIG. 5 is a schematic view of a second observation system formed to carry out a bidimensional mapping of the solar luminance, established both in elevation according to an east-west direction and in azimuth according to a north-south direction.

In a second embodiment illustrated in FIG. 5, the observation system 2b comprises a hemispherical dome shaped support 21b supporting photosensitive cells 22.

These photosensitive cells 22 are positioned along several strips Bi (shown in FIGS. 6 and 7b) distributed according to several angles called elevation angles θi which are measured with respect to the vertical axis Z in the plane (Y, Z) about the axis X, the reference frame (X, Y, Z) being centered on the center O of the full dome 21. Hence, the elevation angle θi is to be matched with the inclination angle of the solar tracker 1. In the example of FIG. 5, the photosensitive cells 22 are distributed according to seven strips at elevation angles of 0, +θ1, +θ2, +θ3, −θ1, −θ2 and −θ3; for example with [θ1]=30 degrees, [θ2]=60 degrees and [θ3]=90 degrees. These elevation angles θi are also shown in FIG. 7b.

In this second embodiment, one or several photosensitive cell(s) 22 are present on each strip Bi. In the case of a strip Bi with several photosensitive cells 22, the photosensitive cells 22 of the same strip Bi are distributed according to several angles called azimuth angles Rj which are measured with respect to the vertical axis Z in the plane (X, Z) around the axis Y. Thus, besides being distributed according to the strips Bi at different elevation angles θi, the photosensitive cells 22 are also distributed according to columns Cj (shown in FIGS. 6 and 7a) at different azimuth angles Rj; these azimuth angles Rj are shown in FIG. 7a.

In these two embodiments, the more the observation system 2a, 2b comprises photosensitive cells 22, and in particular the more the observation system 2a, 2b comprises strips Bi of photosensitive cells 22, the better will be the resolution and the angular accuracy.

These photosensitive cells 22 may be of the same technology as the photovoltaic panels 13 in order to enable the application of a weighting depending on the useful wavelength range of the photovoltaic panels 13. Preferably, these photosensitive cells 22 will undergo a prior calibration in order to obtain a better accuracy.

Figure 6:
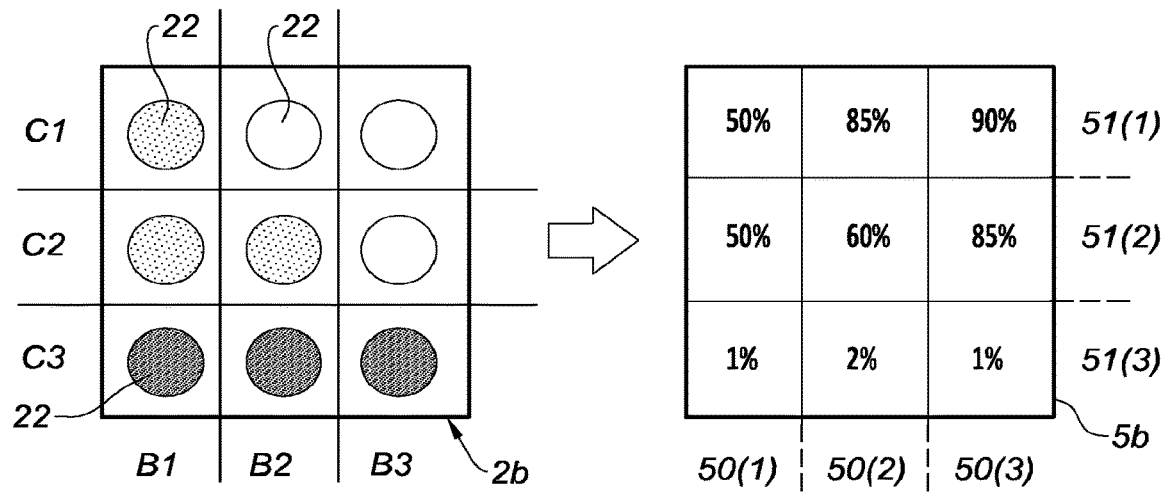
FIG. 6 is flat down schematic representation of a second observation system equivalent to that of FIG. 5 (to the left), and of a bidimensional mapping of the solar luminance (to the right) derived from such an observation system.

Thus, with such a first or second observation system 2a, 2b, by recovering the measurements of the luminosity of each photosensitive cell 22 and by knowing the elevation angles θi (or associated inclination angles) of the different strips Bi, and where appropriate the azimuth angles Rj of the different columns Cj, the cartographic module 40 converts an observation performed by the first or second observation system 2a, 2b into a mapping 5a, 5b of the solar luminance which is unidimensional for the first observation system 2a (see the mapping 5a shown in FIG. 4) or bidimensional for the second observation system 2b (see the mapping 5b shown in FIG. 6).

Figure 4:
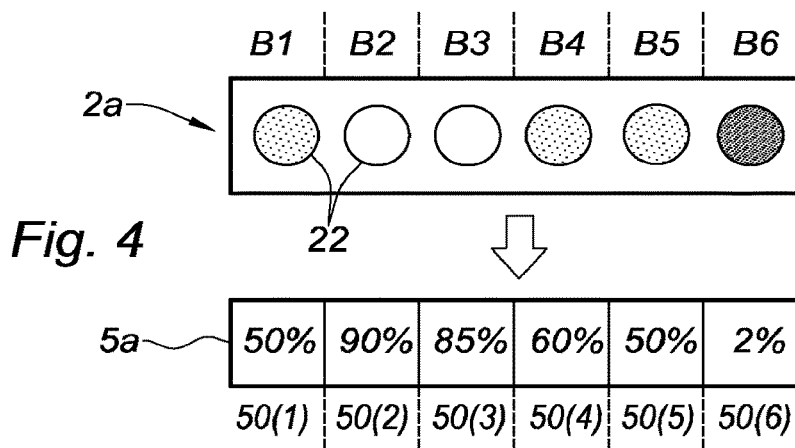
FIG. 4 is a flat down schematic representation of a first observation system equivalent to that of FIG. 3 (to the left), and of a unidimensional mapping of the solar luminance (to the right) derived from such an observation system.

Referring to FIG. 4, for the first observation system 2a, the unidimensional mapping 5a forms a solar luminance map comprising several strips 50(i) (i being an integer) distributed or established according to a direction parallel to the transverse axis Y (in other words according to an east-west direction), and associated respectively to different elevation or inclination angles θi, so that each strip 50(i) corresponds to an inclination angle θi of the solar tracker 1; recalling that this elevation angle θi is measured around the north-south axis X.

Thus, the unidimensional mapping 5a comprises NB strips 50(i) (where NB corresponds to the number of photosensitive cells 22) and an (absolute or relative) solar luminance value Lum(i) corresponds to each strip 50(i).

In FIG. 4 to the top, an example of the first observation system 2a is schematically illustrated flat down and comprises six photosensitive cells 22 distributed according to six strips B1 to B6 which are associated to six elevation angles (or inclination angles). A unidimensional mapping 5a with six strips 50(1) to 50(6) corresponds to this first observation system 2a, and where the solar luminance values are expressed in a relative manner as a percentage of a maximum solar luminance value corresponding to the maximum value of the solar luminance accessible during a direct radiation observation. Thus, a 100% percentage corresponds to this maximum solar luminance value.

Referring to FIG. 6, for the second observation system 2b, the bidimensional mapping 5b forms a solar luminance map (or matrix) comprising:

several strips 50(i) (i being an integer) distributed according to a first direction parallel to the transverse axis Y (in other words according to an east-west direction), and associated respectively to different elevation or inclination angles θi, so that each strip 50(i) corresponds to an inclination angle θi of the solar tracker 1 (recalling that this elevation angle θi is measured around the north-south axis X); and several columns 51(j) (j being an integer) distributed according to a second direction parallel to the axis X (in other words according to a north-south direction) and associated respectively to different azimuth angles Rj (recalling that this azimuth angle Rj is measured around the east-west axis Y).

Thus, the bidimensional mapping 5b comprises NT boxes (where NT corresponds to the number of photosensitive cells 22) and an (absolute or relative) solar luminance value Lum(i, j) corresponds to each box.

In FIG. 6 to the left, an example of the second observation system 2b is schematically illustrated flat down and comprises nine photosensitive cells 22 distributed according to three strips B1, B2, B3 which are associated to three elevation angles (or inclination angles), and according to three columns C1, C2, C3 which are associated to three azimuth angles. A bidimensional mapping 5b with three strips 50(1), 50(2), 50(3) and three columns 51(1), 51(2), 51(3) corresponds to this second observation system 2b, and where the solar luminance values are expressed in a relative manner as a percentage of a maximum solar luminance value.

Figure 8:
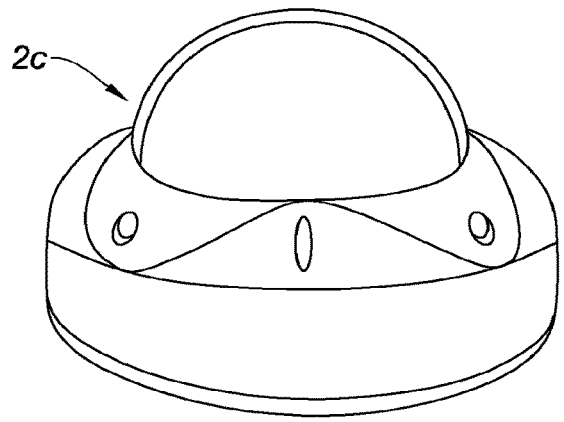
FIG. 8 is a schematic view of a third observation system of the camera type.

In a third embodiment illustrated in FIG. 8, the observation system 2c comprises a camera, in particular a hemispherical camera, in order to extract images from the sky.

Advantageously, the third observation system 2c (called camera in the following) is formed to take images in a spectral band sufficient for the technology of the solar collectors 13, and in particular of the photovoltaic panel(s).

Figure 9:
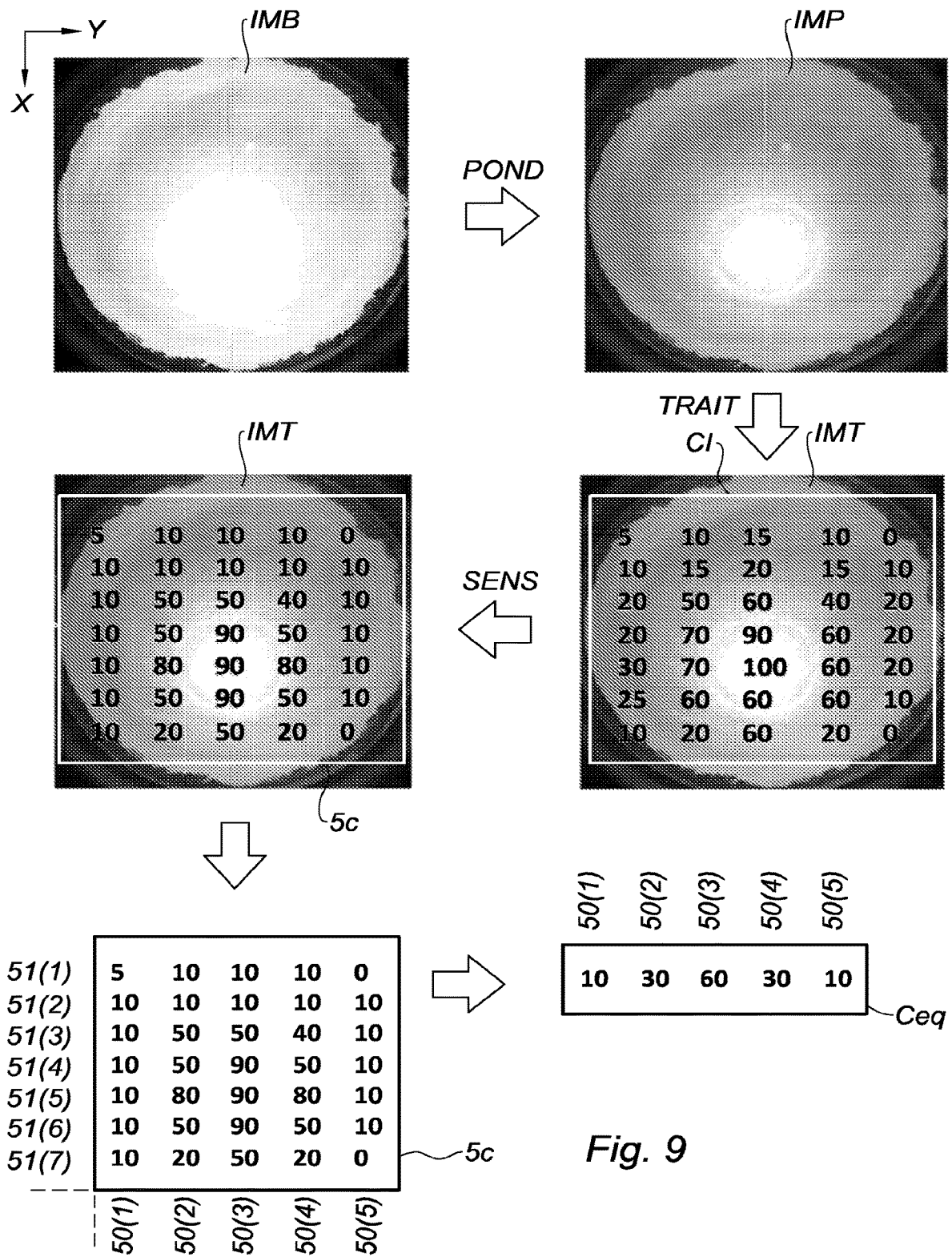
FIG. 9 is a schematic representation of an observation (the image at the top left) performed by a third observation system equivalent to that of FIG. 8, and of a bidimensional mapping of the solar luminance (at the bottom left) derived from such an observation, after several image processing steps, and of a unidimensional mapping of equivalent luminance values (at the bottom right) derived from this bidimensional mapping.

Referring to FIG. 9, the camera 2c delivers a raw image IMB of the sky which is delivered afterwards to the cartographic module 40 to convert this raw image IMB (or observation) into a bidimensional mapping 5 of the solar luminance. A reference frame (X, Y) is associated to this bidimensional raw image IMB, these axes X and Y having already been defined hereinbefore.

With such a camera 2c, the cartographic module 40 implements a succession of image processing steps starting from the raw image IMB until the mapping 5c.

At a first step POND, the cartographic module 40 implements a frequency weighting applied on the recovered raw image IMB (or video signal), in order to obtain an image called weighted image IMP; this frequency weighting consisting in applying a frequency filter on the observation (such a weighting may also be applied on the observation performed by the first and second observation systems 2a, 2b) which depends on both the frequency response of the observation system 2 (whether the photosensitive cells 22 or the camera 2c) and the useful frequency band (or spectral response) of the photovoltaic panels 13.

At a second step TRAIT, the cartographic module 40 implements a processing of the weighted image IMP consisting in correcting the image from defects (noise suppression processing, blooming processing, saturation processing . . . ) in order to obtain an image called processed image IMT. Then, the cartographic module 40 implements a calculation (whether pixel by pixel, or area by area where each area comprises several pixels) of the distribution of the solar luminance on the processed image IMT in order to generate a bidimensional initial mapping CI forming a map (or matrix) of solar luminance distributed according to several strips associated respectively to different elevation or inclination angles θ(i) and according to several columns associated respectively to different azimuth angles; in FIG. 9, the solar luminance values of the initial mapping CI are expressed in a relative manner as a percentage of the maximum solar luminance value.

At a third step SENS, the mapping module 40 applies on the initial mapping CI a coefficient depending on the variation of the sensitivity of the camera 2, in order to generate a bidimensional mapping 5c of the same type as the bidimensional mapping 5b described hereinabove. Indeed, the magnitude (or luminosity) of the data delivered by the camera 2 is proportionally related to the value of the solar radiation, so that this coefficient takes into account this proportionality depending on the variation of the sensitivity of the camera 2.

Thus, the mapping module 40 generates a bidimensional mapping 5c forming a map (or matrix) of solar luminance distributed according to several strips 50(i) associated respectively to different elevation or inclination angles θi and according to several columns 51(j) associated respectively to different azimuth angles Rj. In the example of FIG. 9, the mapping 5 comprises five strips 50(1), . . . , 50(5) and seven columns 51(1), . . . , 51(7), and the solar luminance values are expressed in a relative manner as a percentage of the maximum solar luminance value.

The resolution of the mapping 5 (in other words the number of strips and columns) and therefore the angular accuracy depend on the fineness of the image processing implemented by the mapping module 40, and also on the sensitivity and on the resolution of the observation system 2. For the first and second observation systems 2a, 2b with photosensitive cells 22, this sensitivity depends on the sensitivity of the photosensitive cells 22, and this resolution depends on the number and on the distribution of the photosensitive cells 22. For the third observation system 2c of the camera type, this sensitivity and this resolution depend on the quality of the camera.

Starting from such a mapping 5a, 5b, 5c (whether it is derived from either one of the observation systems 2a, 2b, 2c described hereinabove), the comparator module 41 implements a comparison of this mapping 5a, 5b, 5c with the cartographic models 6 in order to extract a close or equivalent cartographic model 6 according to predefined matching criteria.

In the case of the first observation system 2a, the mappings 5a are unidimensional, the associated cartographic models 6a are also unidimensional, and each translates a theoretical cloud coverage model reflected by a distribution of the solar luminance according to several strips associated respectively to different elevation or inclination angles θi.

Figure 11:
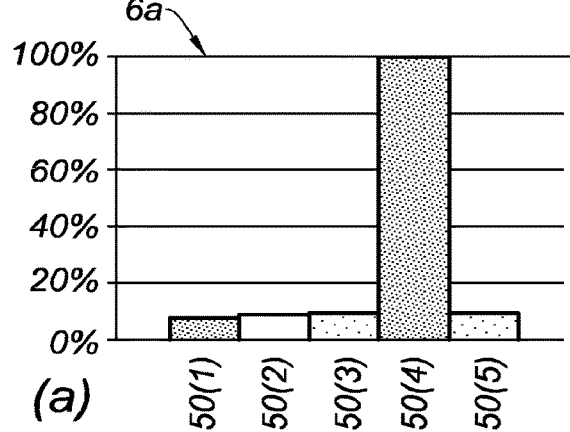
FIG. 11 represents five cartographic models (a) to (e) associated to the first observation system of FIG. 10.
Figure 11:
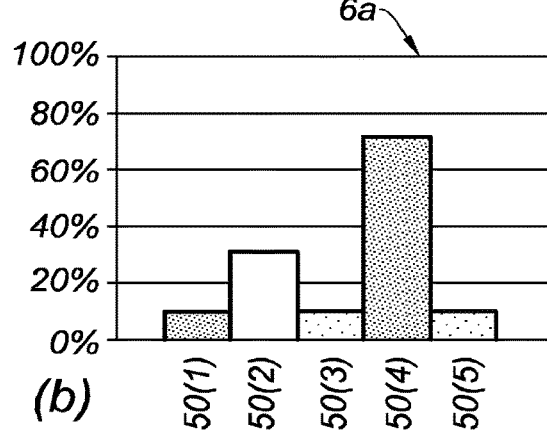
Figure 11:
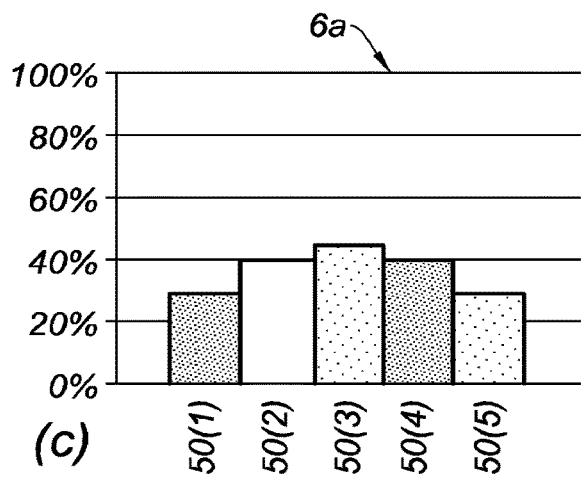
Figure 11:
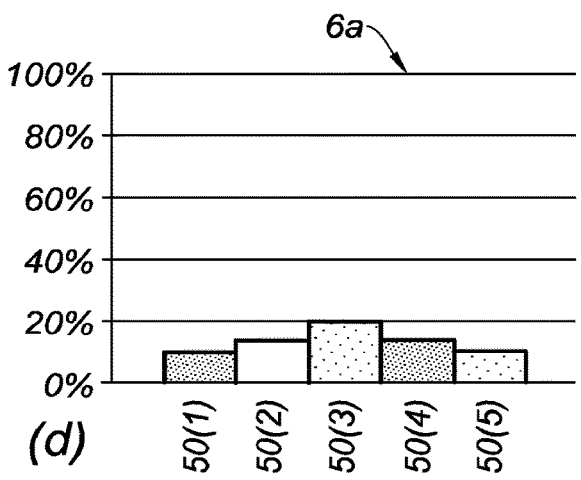
Figure 11:
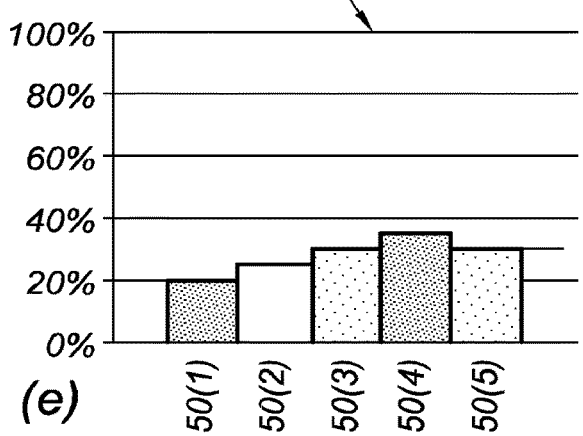

Referring to FIGS. 10 and 11, with a first observation system 2a comprising 5 photosensitive cells 22 distributed at five elevation angles θ1, θ2, θ3, θ4 and θ5, several associated examples of unidimensional cartographic models 6a are illustrated; these cartographic models 6a being illustrated in the form of histograms (equivalent to the mapping 5a of FIG. 4), with the ordinate being the value of the solar luminance expressed in a relative manner as a percentage of the maximum solar luminance value, and with the abscissa being the strips 50(i) (or the elevation angles θi).

A first model 6a illustrated by the histogram 11(a) corresponds to a zero-cloud coverage model, where the solar luminance is at least equal to 80% of the maximum value within an angular sector smaller than 30 degrees around the direct inclination angle.

In this histogram 11(a), it should be noted that:
to the strip 50(4) and therefore to the elevation angle θ4, is associated a 100% relative solar luminance,
for the other strips 50(1), 50(2), 50(3), 50(5), the relative solar luminance is lower than 10%.

This zero-cloud coverage model models a sky with almost no clouds, where the direct radiation is located substantially at the elevation angle θ4.

A second model 6a illustrated by the histogram 11(b) corresponds to an irregular cloud coverage model, where the solar luminance is at least equal to 50% of the maximum value within an angular sector smaller than 30 degrees around the direct inclination angle, and is at least equal to 20% of the maximum value within an angular sector smaller than 30 degrees around another inclination angle.

In this histogram 11(b), it should be noted that:
to the strip 50(4) and therefore to the elevation angle θ4, is associated a 70% relative solar luminance,
to the strip 50(2) and therefore to the elevation angle θ2, is associated a 30% relative solar luminance,
for the other strips 50(1), 50(3) and 50(5), the relative solar luminance is lower than 10%.

This irregular cloud coverage model models a sky with one single cloud or a few clouds distributed in an irregular manner, where the direct radiation is located substantially at the elevation angle θ4 and where the diffuse radiation of the cloud(s) is located substantially at the elevation angle θ2.

A third and a fourth model 6a illustrated by the histograms 11(c) and 11(d) each corresponds to a widespread cloud coverage model, where the solar luminance has, within an angular sector larger than 150 degrees, a low value and a high value, with a difference between the low value and the high value which is lower than 50% of the high value, with the high value which is lower than 50% of the maximum value and with the high value which is associated to an elevation angle deviated by at least 20 degrees from the direct inclination angle.

In the histogram 11(*c*), it should be noted that the high value is 45% at the elevation angle θ3 and the low value is 30% at the elevation angles θ1 and θ5, whereas the direct inclination angle corresponds substantially to the elevation angle θ4. In the histogram 11(*d*), it should be noted that the high value is 20% at the elevation angle θ3 and the low value is 10% at the elevation angles θ1 and θ5, whereas the direct inclination angle corresponds substantially to the elevation angle θ4.

This widespread cloud coverage model models an overcast sky, with a cloudy surface almost uniform over the entire observed sky portion. The model of the histogram 11(*d*) models a cloud coverage thicker than in the model of the histogram 11(*c*).

A fifth model 6*a* illustrated by the histogram 11(*e*) corresponds to a fine cloud coverage model where the solar luminance has, within an angular sector larger than 150 degrees, a low value and a high value, with a difference between the low value and the high value which is lower than 50% of the high value and with the high value which is associated to an elevation angle located at less than 20 degrees from the direct inclination angle.

In the histogram 11(*e*), it should be noted that the high value is 37% at the elevation angle θ4 which corresponds substantially to the direct inclination angle, and the low value is 20% at the elevation angle θ1 the farthest from the elevation angle θ4.

In the case of the second and third observation systems 2*b*, 2*c*, the mappings 5*b*, 5*c* being bidimensional, the associated cartographic models 6 are also bidimensional, and each translates a theoretical cloud coverage model reflected by a distribution of the solar luminance according to several strips associated respectively to different elevation or inclination angles θi and according to several columns associated respectively to different azimuth angles Rj.

However, it can be considered to use unidimensional cartographic models 6*a* for the mappings 5*b*, 5*c* of the second and third observation systems 2*b*, 2*c*. For this purpose, the cartographic module 40 would have to convert the bidimensional mappings 5*b*, 5*c* into an equivalent unidimensional mapping.

As example, and with reference to FIG. 9, this conversion consists in calculating, for each strip 50(*i*) of the bidimensional mapping 5*c*, an equivalent luminance value Leq(i) from all the luminance values L(i, j) taken in the strip 50(*i*). For each strip 50(*i*), the equivalent luminance value Leq(i) of the strip 50(*i*) depends on the luminance values L(i, j) taken in the strip 50(*i*) and on the azimuth angles Rj of the different columns 51(*j*) according to the following formula (with reference to FIG. 7*a*):

$$Leq(i) = \sum_{j} Lum(i, j) \times \cos Rj$$

Thus, an equivalent unidimensional mapping Ceq is obtained reflecting the distribution of the equivalent luminance values Leq(i) associated to the different strips 50(*i*). Afterwards, it is this equivalent unidimensional mapping Ceq which will be compared with the unidimensional cartographic models 6*a*.

Figure 12:
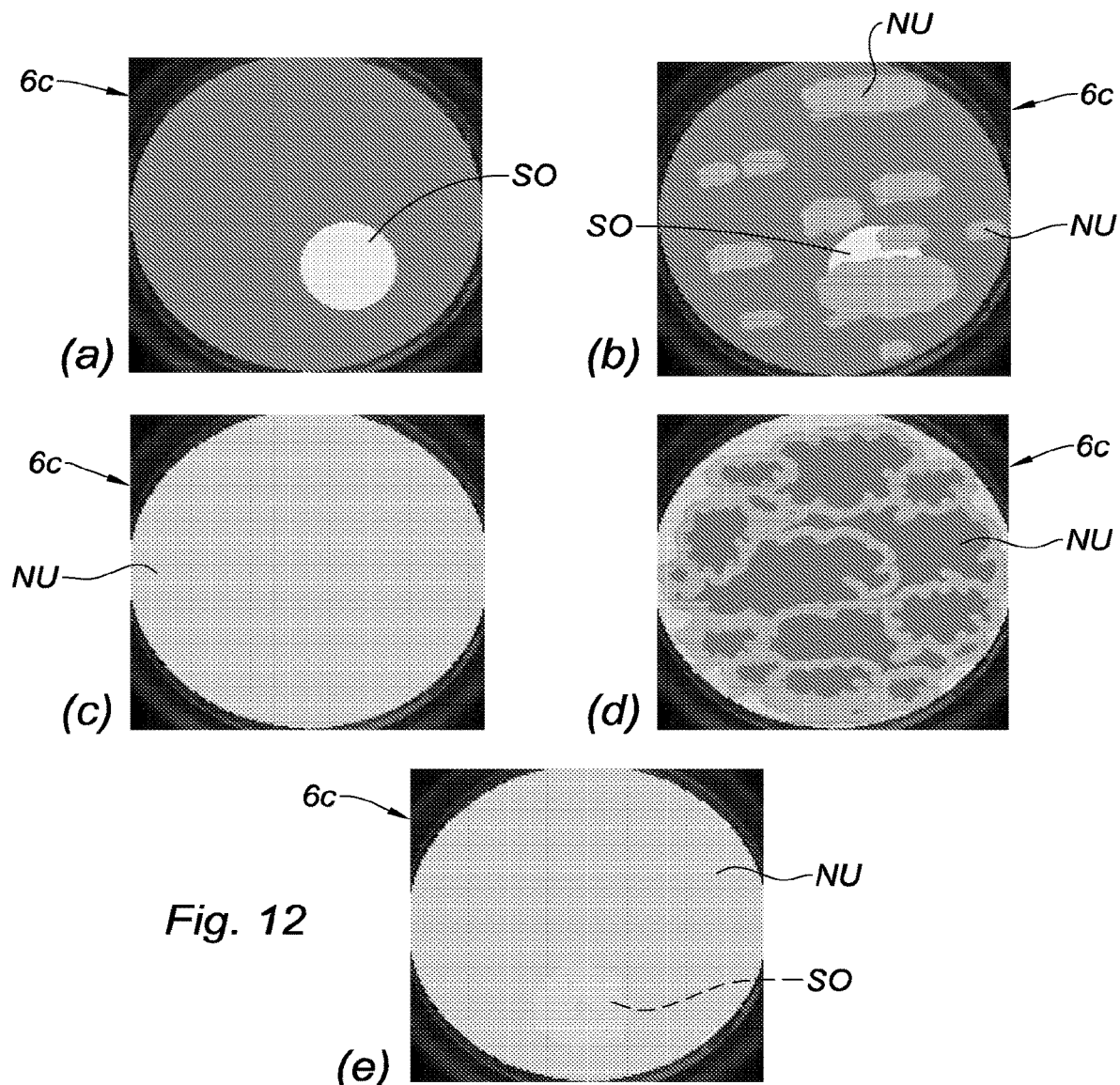
FIG. 12 represents five cartographic models (a) to (e) associated to the third observation system of FIG. 8.

Referring to FIG. 12, with a third observation system 2*c*, several associated examples of bidimensional cartographic models 6*c* are illustrated; these cartographic models 6*c* being illustrated in the form of two-dimensional images.

A first model 6*c* illustrated by the image 12(*a*) corresponds to a zero-cloud coverage model, just like the model 6*a* of the histogram 11(*a*), where the Sun SO is fully visible without the presence of any cloud. A second model 6*c* illustrated by the image 12(*a*) corresponds to an irregular cloud coverage model, just like the model 6*a* of the histogram 11(*b*), where a few sparse clouds NU do not completely hide the Sun SO. A third model 6*c* illustrated by the image 12(*c*) corresponds to a widespread cloud coverage model, just like the model 6*a* of the histogram 11(*c*), where the sky is completely cloudy with clouds NU distributed in a uniform manner and hiding the Sun. A fourth model 6*c* illustrated by the image 12(*d*) corresponds to a widespread cloud coverage model, just like the model 6*a* of the histogram 11(*d*), where the sky is completely cloudy with clouds NU distributed in a uniform manner and hiding the Sun, these clouds being thicker than those of the image 12(*c*). A fifth model 6*c* illustrated by the image 12(*e*) corresponds to a fine cloud coverage model, just like the model 6*a* of the histogram 11(*e*), where the sky is completely cloudy with clouds NU distributed in a uniform manner, but where the Sun SO remains visible through the fine thickness of the clouds NU.

As regards the zero-cloud coverage and irregular cloud coverage models (illustrated in the histograms 11(*a*), 11(*b*), and in the images 12(*a*) and 12(*b*)), the associated orientation setpoint value is an orientation setpoint value on the direct inclination angle.

As regards the widespread cloud coverage models (illustrated in the histograms 11(*c*), 11(*d*), and in the images 12(*c*) and 12(*d*)), the associated orientation setpoint value is an orientation setpoint value on an inclination angle called optimized inclination angle which corresponds to a zero-inclination angle for the horizontal setting of the solar tracker 1.

As regards the fine cloud coverage model (illustrated in the histogram 11(*e*) and in the image 12(*e*)), the associated orientation setpoint value is an orientation setpoint value on a predefined intermediate inclination angle taken between the direct inclination angle and the zero angle (corresponding to a horizontal setting of the solar tracker 1).

It should be recalled that the comparator module 41 compares the mapping coming from the cartographic module 40 with the cartographic models 6 stored in a database 44, and matches said mapping with a cartographic model 6 established as being the closest in terms of solar luminance distribution.

In order to carry out this comparison and this matching, the comparator module 41 compares the solar luminances strip by strip (and possibly column by column), and retains the cartographic model 6 having, for each strip, the greatest proximity in the value of the solar luminance with regards to a given tolerance.

Afterwards, once a cartographic model 6 is retained, the orientation setpoint value associated to the retained cartographic model 6 is addressed to the servo-control module 42, this servo-control module 42 also recovering the direct inclination angle coming from the astronomical calculation module 43.

Then, the servo-control module 42 addresses to the actuation system 3 an angular setpoint established on the basis of the orientation setpoint value associated to the retained cartographic model 6, and which may take on the value of the direct inclination angle (in the case of the zero-cloud coverage and irregular cloud coverage models), the zero value (in the case of the widespread cloud coverage models) or an intermediate value between the zero value and the value of the direct inclination angle (in the case of the fine cloud coverage models).

It should be noted that if, within a certain time period, no cartographic model 6 of the database is matched with the successive mappings 5 derived from the observation (because the differences in solar luminance between the mappings 5 and the cartographic models 6 exceed the tolerances), then the servo-control module 42 automatically switches into a servo-control on the direct inclination angle.

It should be noted that, starting from a situation of servo-control on a first orientation setpoint value associated to a first cartographic model 6, the servo-control module 42 switches into a servo-control on a second orientation setpoint value associated to a second cartographic model 6 only if, within a certain time period, only the second cartographic model 6 is matched with the successive mappings 5 derived from the observation. In other words, the servo-control module 42 sets a time delay to perform an orientation change, so that the second cartographic model 6 should be matched with the mappings 5 long enough before the servo-control module 42 follows the second orientation setpoint value.

The minimum time period of this time delay depends on the time, the angular deviation between the first orientation setpoint value and the second orientation setpoint value, a wear rate of mechanical members of the solar tracker 1 loaded during a change of orientation of the solar tracker 1, and an energy consumption necessary to modify the orientation of the solar tracker.

Of course, the example of implementation mentioned hereinabove is not limiting and other improvements and details may be added to the solar tracker according to the invention, nevertheless without departing from the scope of the invention where other types of fixed structure or platform may be for example carried out.

The invention claimed is:

1. A method for controlling a solar tracker comprising:
   determining cloud coverage above the solar tracker via satellite images of the sky over the solar tracker;
   comparing the determined cloud coverage with cloud coverage models stored in a database, each cloud coverage model being associated with an orientation setpoint for the solar tracker;
   matching the determined coverage with a cloud coverage model; and
   controlling the orientation of the solar tracker to the orientation setpoint of the matched cloud coverage model,
   wherein the cloud coverage models include:
   a zero cloud coverage model associated with a direct radiation inclination angle orientation setpoint; and
   a widespread cloud coverage model associated with an indirect radiation inclination angle orientation setpoint.

2. The method according to claim 1, wherein each cloud coverage model is associated with an orientation setpoint value which depends on a composition of a cloud layer of the cloud coverage model, the composition depending on at least one of a number of clouds, coverage surface of the clouds, thickness of the clouds, location of the clouds, and type of the clouds.

3. The method according to claim 1, wherein, for each cloud coverage model, the corresponding orientation setpoint is predefined according to an energy consumption necessary to modify the orientation of the solar tracker.

4. The method according to claim 1, wherein, for each cloud coverage model, the corresponding orientation setpoint is predefined according to a displacement speed of the solar tracker during an orientation change.

5. The method according to claim 1, wherein the cloud coverage models comprise at least one fine cloud coverage model to which an orientation setpoint value is associated on a predefined intermediate angle between the direct radiation inclination angle orientation setpoint and the indirect radiation inclination angle orientation setpoint.

6. The method according to claim 1, wherein the cloud coverage models comprise at least one irregular cloud coverage model to which an orientation setpoint value is associated with the direct radiation inclination angle orientation setpoint.

7. The method according to claim 1, further comprising translating the determined cloud coverage into a mapping of solar luminance.

8. The method according to claim 7, wherein the cloud coverage models are based on different cartographic models and the comparison between the determined cloud coverage with the cloud coverage models is based on a comparison between the distribution of the solar luminance on the mapping with the distribution of the solar luminance in the different cartographic models.

9. The method according to claim 1, further comprising:
   determining that no cloud coverage model matches the determined cloud coverage; and
   in response to determining that no cloud coverage model matches the determined cloud coverage, controlling the orientation of the solar tracker to the direct radiation inclination angle orientation setpoint.

10. A solar tracker comprising:
    a fixed structure;
    a platform supporting at least one solar collector, the platform being rotatably actuatable on the fixed structure by an actuation system;
    a memory storing satellite images of the sky over the solar tracker and cloud coverage models; and
    a controller coupled to the memory and the actuation system, wherein the controller is configured to:
       compare cloud coverage determined via satellite images of the sky over the solar tracker with the cloud coverage models stored in the memory, each cloud coverage model being associated with an orientation setpoint for the solar tracker;
       match the determined cloud coverage with a cloud coverage model; and
       control the orientation of the solar tracker to the orientation setpoint of the matched cloud coverage model,
    wherein the cloud coverage models include:
       a zero cloud coverage model associated with a direct radiation inclination angle orientation setpoint; and
       a widespread cloud coverage model associated with an indirect radiation inclination angle orientation setpoint.

11. The solar tracker according to claim 10, wherein each cloud coverage model is associated with an orientation setpoint value which depends on a composition of a cloud layer of the cloud coverage model, the composition depending on at least one of a number of clouds, coverage surface of the clouds, thickness of the clouds, location of the clouds, and type of the clouds.

12. The solar tracker according to claim 10, wherein, for each cloud coverage model, the corresponding orientation setpoint is predefined according to an energy consumption necessary to modify the orientation of the solar tracker.

13. The solar tracker according to claim 10, wherein, for each cloud coverage model, the corresponding orientation setpoint is predefined according to a displacement speed of the solar tracker during an orientation change.

14. The solar tracker according to claim 10, wherein the cloud coverage models comprise at least one fine cloud coverage model to which an orientation setpoint value is associated on a predefined intermediate angle between the direct radiation inclination angle orientation setpoint and a zero inclination angle orientation setpoint.

15. The solar tracker according to claim 10, wherein the cloud coverage models comprise at least one irregular cloud coverage model to which an orientation setpoint value is associated with the direct radiation inclination angle orientation setpoint.

16. The solar tracker according to claim 10, wherein the controller is further configured to translate the determined cloud coverage into a mapping of solar luminance.

17. The solar tracker according to claim 16, wherein the cloud coverage models are based on different cartographic models and the comparison between the determined cloud coverage with the cloud coverage models is based on a comparison between the distribution of the solar luminance on the mapping with the distribution of the solar luminance in the different cartographic models.

* * * * *